UNITED STATES PATENT OFFICE.

FRANK K. CAMERON AND JOHN A. CULLEN, OF SALT LAKE CITY, UTAH, AND REED W. HYDE, OF NEW YORK, N. Y., ASSIGNORS TO AMERICAN SMELTING & REFINING COMPANY, OF SALT LAKE CITY, UTAH, A CORPORATION OF NEW JERSEY.

METHOD OF TREATING ZINC-BEARING ORES.

1,352,399.   Specification of Letters Patent.   Patented Sept. 7, 1920.

No Drawing.   Application filed July 17, 1917.   Serial No. 181,169.

*To all whom it may concern:*

Be it known that we, (1) FRANK K. CAMERON, (2) JOHN A. CULLEN, and (3) REED W. HYDE, citizens of the United States, residing at (1) Salt Lake City, (2) Salt Lake City, (3) New York city, in the counties of (1) Salt Lake, (2) Salt Lake, (3) New York, and States of (1) Utah, (2) Utah, (3) New York, have invented certain new and useful Improvements in Methods of Treating Zinc-Bearing Ores, of which the following is a specification.

This invention is a method of preparing chlorids of zinc, including the double chlorids of zinc with the alkali metals, from sulfate of zinc. Inasmuch as the latter salt may be prepared directly from oxid or sulfid ores of zinc by various methods, the present invention permits the preparation of merchantable zinc chlorid, as well as of the double halids mentioned above, from zinc ores by a simple and economical process. We prefer to proceed as follows:—

Zinc sulfate is first prepared in any desired manner, for example by furnacing oxid ores of zinc with strong sulfuric acid and subsequently leaching the resulting dry mass.

The resulting sulfate solution is freed as far as desired from iron, manganese, etc., according to the known methods. Sodium chlorid is then added in excess, and the solution is then evaporated, preferably to a density of about 55° Bé., more or less. Upon cooling this concentrated solution, practically all of the sulfuric acid radical will separate as solid sodium sulfate. The mother-liquor, consisting essentially of an aqueous solution of zinc chlorid and sodium chlorid is drained, filtered or centrifuged from the crystallized sodium sulfate, and the latter is washed several times with small portions of a strong (but not completely saturated) solution of sodium chlorid, in order to remove the adhering zinc chlorid solution.

These washings are added to the filtrate which is then evaporated until the hot solution has a density preferably of 60° Bé. or somewhat higher. The solution is then permitted to cool, whereupon the major portion of the zinc chlorid will separate as the known double halid salt, $ZnCl_2.2NaCl.3H_2O$. This salt usually separates in the form of quite pure crystals, which can be readily separated from the mother-liquor by centrifuging.

In case a sufficient proportion of sodium chlorid has not been used to form the above salt, nevertheless a large proportion of the zinc chlorid will separate in the form of the known double halid, $ZnCl_2.NaCl.3H_2O$, this salt also separating in a reasonably pure state, well crystallized, and readily separated from the mother-liquor. The mother-liquor may advantageously be added to succeeding portions of zinc sulfate, until accumulated impurities justify other disposition or separate purification. As a rule the double halids separated as above will be found sufficiently pure for commercial purposes, but they may of course be further purified by recrystallization if desired. These salts in themselves should have great technical importance, for example in the weighting of silk and other fabrics by the zinc phosphate process, and especially in the preservation of wood by impregnation. It has been claimed by some authorities that sodium chlorid is for many purposes a better wood preservative than zinc chlorid and there are indications that the two salts used together possess certain advantages over either of them alone. Furthermore, these double halids lend themselves to the ready preparation of zinc chlorid of high purity.

If to the double halid a strong solution of hydrochloric acid (30 per cent. or higher) be added, and the mixture agitated, sodium chlorid separates gradually in the solid phase, in contact with a mother-liquor consisting of a solution of zinc chlorid containing also hydrochloric acid. A preferred procedure is to suspend the double halid by mechanical agitation in less water than is required for its complete solution, that is to say, to suspend it in a saturated solution of the same salt, and then to introduce gaseous hydrochloric acid until the solution is saturated therewith. It is even advantageous to introduce the gaseous acid under slightly superatmospheric pressures, inasmuch as the amount dissolved is thereby materially increased. The sodium chlorid will be precipitated with substantial completeness, together with small amounts of sulfates which may remain in the solution. The mass is then filtered, and the residual sodium chlorid is used for the treatment of further portions of the zinc sulfate solution. The filtrate is heated to drive off the excess of hydrochloric acid, which is collected, and reused, the excess of water being at the same time evaporated. Zinc chlorid may of course be concentrated until practically anhydrous, or the hydrated crystallized salt can be prepared in the known manner. If proper care is exercised the product obtained is in every way equal or superior to the usual distilled salt, and the method does not involve the expense of distillation, or the decomposition of zinc chlorid and the formation of oxychlorid which always attends the distilling operation.

Instead of sodium chlorid, other chlorids of the alkali metals including those of potassium and ammonium may be employed to form a crystallizable double halid of zinc, the sodium salt being however preferred in practice.

We claim:—

The method of treating zinc-bearing ores, which consists in converting the zinc component of the ore into sulfate, adding thereto an alkali-metal chlorid in proportion at least sufficient to transform the zinc sulfate into chlorid and to form therewith a crystallizable double halid salt, and crystallizing the said double halid from the solution.

In testimony whereof, we affix our signatures.

(1) FRANK K. CAMERON.
(2) JOHN A. CULLEN.
(3) REED W. HYDE.